Patented Nov. 20, 1945

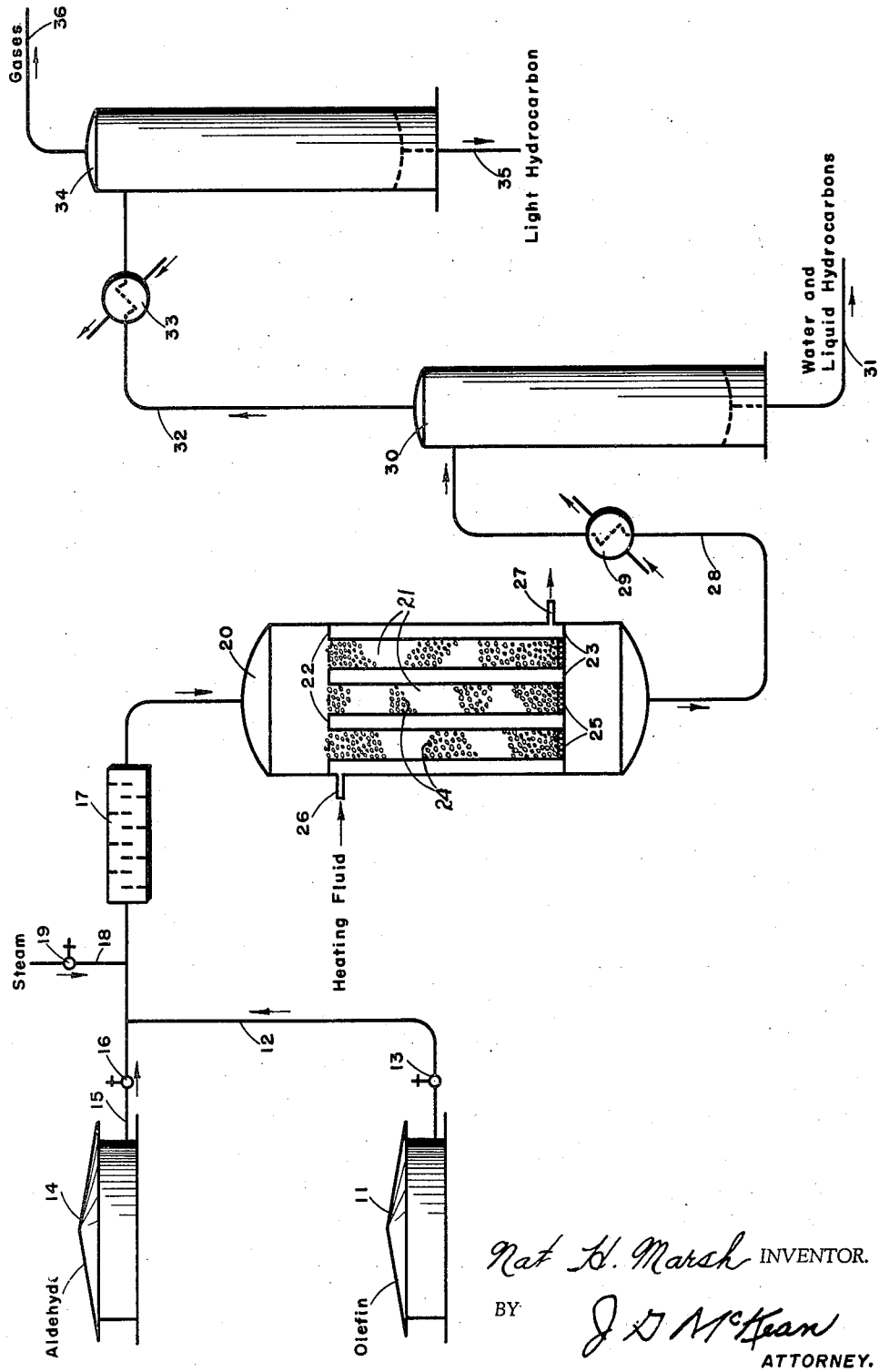

2,389,205

UNITED STATES PATENT OFFICE 2,389,205

PREPARATION OF DIOLEFINS

Nat H. Marsh, Baytown, Tex., assignor to Standard Oil Development Company, a corporation of Delaware Application June 28, 1943, Serial No. 492,502

4 Claims. (Cl. 260—681)

The present invention is directed to the preparation of diolefins by the reaction of mono-olefins with aldehydes.

It is an object of the present invention to produce diolefins by passing an admixture of aldehyde and mono-olefin in the vapor phase over a suitable catalyst to obtain conjugated diolefins.

Other objects and advantages of the present invention may be seen from a reading of the following description taken with the drawing, in which the sole figure is in the form of a flow sheet illustrating a preferred embodiment of the present invention.

Turning now specifically to the drawing, a mono-olefin may be withdrawn from storage vessel 11 via line 12, containing a control valve 13 and admixed with an aldehyde withdrawn from storage vessel 14 via line 15, provided with a suitable control valve 16. Line 15 is provided with a mixing chamber 17 to insure a thorough mixture of the aldehyde and mono-olefin. Line 18, controlled by valve 19, also discharges into line 15 to allow steam to be added to the mono-olefin-aldehyde mixture if desired.

Line 15 is arranged to withdraw the mixture from mixing chamber 17 and discharge it into chamber 20. Chamber 20 is arranged to contain a catalytic mass and is provided with heating means to control the temperature of the catalyst. To insure effective use of the catalyst and maintenance of the desired temperature of the catalyst, a plurality of vertically arranged tubes 21 are positioned within chamber 20 with an upper tube sheet 22 and a lower tube sheet 23 to maintain the tubes in position and define a zone into which the heating medium may be injected for heating the exteriors of the tubes. Catalytic material 24 is placed in each of tubes 21 with a screen or other suitable arrangement 25 in the lower end of each tube to maintain the catalytic mass in position. The exterior of the tubes may be surrounded by a suitable heating medium such as hot flue gases or mercury vapors which may be circulated by means of inlet 26 and outlet 27.

It has been found that the catalyst 24 employed for contacting the reacting materials should have the characteristics of promoting condensation and dehydration. The catalytic mass should be maintained in the temperature range of 500° to 750° F. Activated alumina and phosphoric acid are particularly useful catalysts in carrying out the reaction of the present invention, but other catalysts having the characteristics of promoting both condensation and dehydration may also be employed. When activated alumina is employed as the catalyst it is desirable to maintain it at a temperature of approximately 650° F., while if a phosphoric acid catalyst is employed it is desirable to maintain it at a temperature of approximately 750° F.

The activated alumina may be prepared by precipitating aluminum hydroxide from aluminum salt solutions with alkali, washing the hydroxide and drying at 300° C., followed by washing the alumina free from adsorbed alkali and other salts and redrying. Other well known methods of preparing activated alumina will suggest themselves to the skilled worker.

The phosphoric acid catalyst employed in the process of the present invention may be prepared in accordance with the disclosures of Ipatieff and Schaad in U. S. Patent No. 2,275,182.

The products of the reaction of the aldehyde and mono-olefin in the presence of the catalyst mass may be withdrawn from vessel 20 via line 28, passed through a suitable cooler 29 and into separating chamber 30. In chamber 30 water and normally liquid hydrocarbons, including diolefins, may be withdrawn from the lower portion of the chamber through line 31, and the lighter materials withdrawn through line 32, cooled to a low temperature in cooler 33 and passed to a second separating chamber 34. The hydrocarbons condensed by the additional cooling and including the light diolefins may be withdrawn from the lower portion of settling chamber 34 through line 35, while the low boiling gases may be withdrawn from the settling chamber through line 36. Usually the major portion of the gases withdrawn through line 36 will consist of hydrogen and carbon monoxide produced by the cracking of aldehyde in the reaction zone.

It will be understood that any suitable aldehyde or mixture of aldehydes may be employed in the reaction of the present invention, and likewise any suitable mono-olefin may be used. Particularly good results have been obtained using formaldehyde as the aldehyde and mono-olefins of the character of isobutylene, butylene-2, propylene and trimethylethylene either alone or in admixture as the mono-olefin in the reaction.

The production of diolefins by the reaction of an aldehyde and a mono-olefin may be represented by the following example, in which formaldehyde is employed as the aldehyde of the reaction and isobutylene as the mono-olefin:

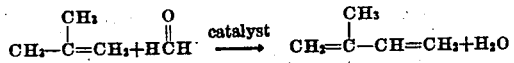

While I do not wish to be bound by the theory of the reaction, it is believed that the production of the conjugated diolefins is brought about by the sequence of reactions which may be represented by the following equation:

Step 1

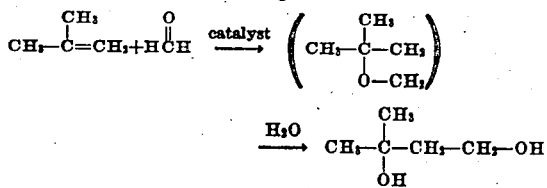

Step 2

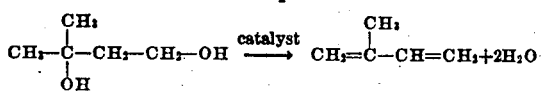

It will be understood that the above postulated series of steps are carried out in one step in the presence of a heated catalyst and that the suggested intermediate products are not present in the materials withdrawn from the reaction zone.

The following examples are given to show the yields which may be obtained under actual operating conditions. In each of the following examples the pressure of the reactants was maintained at approximately one atmosphere in the reaction zone.

*Example 1*

A vaporized mixture composed of isobutylene, formaldehyde and steam, in which the mol ratio of isobutylene to formaldehyde was maintained at 4.2 to 1 and the mol ratio of steam to formaldehyde was maintained at 3.1 to 1, was passed over activated alumina heated to 650° F. at the rate of 1 mol of formaldehyde per pound of alumina per hour. The yield of conjugated diolefins was 17 weight per cent based on the formaldehyde charged. Other reaction products included hydrocarbons, hydrogen and carbon monoxide.

*Example 2*

A vaporized mixture composed of propylene, formaldehyde and steam, in which the mol ratio of propylene to formaldehyde was maintained at 3.1 to 1 and the mol ratio of steam to formaldehyde was maintained at 3 to 1, was passed over activated alumina heated to 642° F. at the rate of 1.9 mols of formaldehyde per pound of alumina per hour. The yield of conjugated diolefins was 21 weight per cent based on the formaldehyde charged, with the remaining products including other hydrocarbons, hydrogen and carbon monoxide.

*Example 3*

A vaporized mixture composed of isobutylene, formaldehyde and steam, in which the mol ratio of isobutylene to formaldehyde was maintained at 4.4 to 1 and the mol ratio of steam to formaldehyde was maintained at 8.4 to 1, was passed over phosphoric acid catalyst heated to 750° F. at the rate of 9.4 mols of formaldehyde per pound of phosphoric acid catalyst per hour. The yield of conjugated diolefins was 14 weight per cent based on the formaldehyde charged, the remaining products of reaction including other hydrocarbons, hydrogen and carbon monoxide.

Having fully described and illustrated the practice of the present invention, what I desire to claim is:

1. A method for producing diolefins comprising the steps of contacting an admixture of isobutylene and formaldehyde in vaporized form with activated alumina maintained at a temperature of approximately 650° F., removing the resulting fluid from contact with said activated alumina, cooling and separating diolefins therefrom.

2. A method in accordance with claim 1 in which steam is admixed with the isobutylene and formaldehyde contacted with said activated alumina.

3. A method for producing diolefins comprising the steps of contacting an admixture of mono-olefin and aldehyde with activated alumina at a temperature within the range of 500° to 750° F. to cause the formation of diolefins, removing the products of said reaction from contact with said catalyst and separating the diolefins therefrom.

4. A method for producing diolefins comprising the steps of admixing formaldehyde with a mono-olefin, passing said admixture over activated alumina maintained in the temperature range of 500° F. to 750° F., withdrawing said fluid mixture from contact with said catalyst, cooling and subsequently separating diolefins therefrom.

NAT H. MARSH.